United States Patent [19]

Burn

[11] Patent Number: 4,845,062
[45] Date of Patent: Jul. 4, 1989

[54] LOW-FIRING DIELECTRIC COMPOSITION

[75] Inventor: Ian Burn, Hockessin, Del.

[73] Assignee: E. I. Du Pont de Nemours and Company, Wilmington, Del.

[21] Appl. No.: 109,585

[22] Filed: Oct. 19, 1987

[51] Int. Cl.$^4$ ................... C04B 35/04; C04B 35/46
[52] U.S. Cl. .................... 501/136; 501/137; 501/138; 501/139; 361/320; 361/321
[58] Field of Search ............... 501/139, 137, 138, 139; 361/320, 321

[56] References Cited

U.S. PATENT DOCUMENTS

| | | | |
|---|---|---|---|
| 2,165,819 | 7/1939 | Albers-Schöberg | 501/136 |
| 3,717,487 | 2/1973 | Hurley et al. | 106/48 |
| 4,101,952 | 7/1978 | Burn | 361/320 |
| 4,308,570 | 12/1981 | Burn | 361/320 |
| 4,506,026 | 3/1985 | Hodgkins et al. | 501/135 |
| 4,533,974 | 8/1985 | Maher | 361/320 |
| 4,640,905 | 2/1987 | Burn | 501/137 |
| 4,706,163 | 11/1987 | Maher | 501/138 |

OTHER PUBLICATIONS

U.S. Ser. No. 003259 (our ref. EL-213), Inventor–Ian Burn, filed—Jan. 1, 1987, "Method for Making a Ceramic Multilayer Structure Having Internal Copper Conductors".

*Primary Examiner*—William R. Dixon, Jr.
*Assistant Examiner*—David M. Brunsman

[57] ABSTRACT

A composition for the preparation of low-firing dielectric layers comprising an admixture of finely divided particles of:

(a) $MgTiO_3$;
(b) 0–10% wt., basis total solids, $CaTiO_3$;
(c) 5–10% wt., basis total solids, zinc borate frit in which the atomic ratio of zinc to boron is 1–3, the frit containing 0–5% wt., basis total solids, BaO, and in which up to 50 mol % of the $B_2O_3$ is replaced by $Al_2O_3$;
(d) 0–5% wt., basis total solids, of a barium compound selected from $BaCO_3$, $BaTiO_3$ and mixtures thereof; and
(e) an amount of a divalent metal oxide or precursor thereof selected from MgO, CaO, ZnO and mixtures thereof in an amount approximately molarly equivalent to the amount of $BaTiO_3$ in the composition, the total amount of Ba in the composition, calculated as BaO, being 1–5% wt. of the total solids, the solids being free of Pb-, Bi- and Cd-containing compounds.

7 Claims, No Drawings

LOW-FIRING DIELECTRIC COMPOSITION

FIELD OF INVENTION

The invention is directed to dielectric compositions which have low firing temperatures and which are particularly suitable for high frequency applications.

BACKGROUND OF THE INVENTION

Because of their high volumetric efficiency and thus their small size, multilayer ceramic capacitors (MLC's) are the most widely used form of ceramic capacitors. These capacitors are fabricated by stacking and co-firing thin sheets of ceramic dielectric on which an appropriate electrode pattern is printed. Each patterned layer is offset from the adjoining layers in such manner that the electrode layers are exposed alternately at each end of the assemblage. The exposed edges of the electrode pattern are coated with a conductive material which electrically connects all the layers of the structure, thus forming a group of parallel connected capacitors within the laminated structure. Capacitors of this type are frequently referred to as monolithic capacitors.

The thin layers of ceramic dielectric used for the fabrication of multilayer devices are comprised of a layer of finely divided dielectric particles which are bound together by an organic polymeric material. The unfired ceramic can be prepared by slip casting a slurry of the dielectric particles dispersed in a solution of polymer, plasticizer and solvent onto a carrier such as polypropylene, Mylar ® polyester film or stainless steel and then adjusting the thickness of the cast film by passing the cast slurry under a doctor blade to form a thin "green tape".

Metallizations useful in producing conductors for multilayer structures normally comprise finely divided metal particles applied to green tape in the form of a dispersion of such particles in an inert liquid vehicle. Although the above-described "green tape" process is more widely used, there are nevertheless other procedures with which dielectric compositions of the invention can be used to make such structures. One technique is the so-called "wet process". In one aspect, this may involve passing a flat substrate through a falling sheet of dielectric slip one or more times to build up a dielectric layer (see Hurley et al., U.S. Pat. No. 4,717,487).

Another "wet process" method of making multilayer structures involves forming a paste of the dielectric material and then alternately screen printing the dielectric and metal layers with intervening drying steps until the designed structure is complete. A second electrode layer is then printed atop the dielectric layer(s) and the entire assemblage is cofired.

There is a need for low k dielectrics that can be used in multilayer structures for high frequency applications. These dielectrics must meet the industry COG specification for temperature stability of better than $+/-30$ ppm/°C. and must have low loss at 1 MHz, e.g. D.F. 0.1%, Q 1000. In addition, dielectrics are required that can be sintered at temperatures low enough to permit use of high silver content electrodes (e.g. 70% Ag-30% Pd) instead of costly palladium. If these dielectrics can also be sintered in atmospheres of low oxygen content, then copper electrodes could be used for even further cost reduction, and possible improved performance.

SUMMARY OF THE INVENTION

A low firing, high Q, MLC dielectric has been developed based on magnesium titanate (MgTiO3) that is compatible with internal electrodes of either 70% Ag-30% Pd, or copper. Temperature stability is obtained with additions of calcium titanate and low sintering temperature is achieved using a zinc borate flux together with a small amount of barium oxide or barium titanate, which were found to enhance sinterability. The composition contains no lead, bismuth or cadmium.

Therefore, in its primary aspect the invention is directed to a low-firing dielectric composition comprising an admixture of finely divided particles of:
 (a) MgTiO3;
 (b) 0-10% wt., basis total solids, CaTiO3;
 (c) 5-10% wt., basis total solids, zinc borate flux in which the atomic ratio of zinc to boron is 1-2, the frit containing 0-5% wt., basis total solids, BaO, and in which up to 50 mol % of the $B_2O_3$ is replaced by $Al_2O_3$;
 (d) 0-5% wt., basis total solids, of a barium compound selected from BaCO3, BaTiO3 and mixtures thereof; and
 (e) an amount of a divalent metal oxide or precursor thereof selected from MgO, CaO, ZnO and mixtures thereof in an amount approximately molarly equivalent to the amount of BaTiO3 in the composition, the total amount of Ba in the composition, calculated as BaO, being 1-5% wt. of the total solids, the solids being fee of Pb-, Bi- and Cd-containing compounds.

In another aspect, the invention is directed to dispersions of the above-described admixtures of solids in an organic medium as a casting solution, as a green tape or as a thick film paste.

In a still further aspect, the invention is directed to dielectric layers made by firing the above-described dispersions to volatilize the organic medium therefrom and to densify the inorganic solids by sintering.

Prior Art

Use of a zinc borate flux containing BaO and MnO2 for sintering dielectrics based on BaTiO3 has been described in U.S. Pat. No. 4,640,905. Although the dielectrics so obtained have very high K, they do not have the temperature stability, or Q, necessary for high frequency applications.

U.S. Pat. No. 4,506,026 by Hodgkins et al. describes a low fire dielectric based on magnesium titanate. A sintering aid is used that contains lead, bismuth and cadmium. Such a flux would be unstable in the atmospheres needed for the firing of MLC's with copper electrodes, as explained in our patent application in pending allowed U.S. patent application Ser. No. 3,259, filed Jan. 13, 1987.

Maher in U.S. Pat. No. 4,533,974 describes a magnesium zinc titanate dielectric with a low melting borate flux, but the dielectric was found to be unsuitable for use with copper electrodes.

A dielectric that is suitable for use with copper electrodes in MLC's is described by Burn in U.S. Pat. No. 4,308,570. The dielectric is based on magnesium titanate and an alkaline earth borate flux is used. However, more than 10% by weight of flux is required for good densification. Such levels of flux tend to degrade the excellent dielectric characteristics of the magnesium titanate, e.g., by lowering its K from 20 to about 10.

DETAILED DESCRIPTION OF THE INVENTION

A. Dielectric Materials

As indicated above, the composition of the invention can be utilized either as a green tape or as a thick film paste. As a green tape, the dielectric materials are dispersed in a solid organic medium which is an organic polymer. On the other hand, as a thick film paste, the solids are dispersed in a liquid organic medium.

The use of $CaTiO_3$ in the composition of the invention is primarily for the purpose of making the capacitance of the dielectric layers made therefrom less sensitive to variations with temperature. The use of $CaTiO_3$ is therefore not mandatory unless the thermal coefficient of capacitance (TCC) is too high. However, it is preferred to use no more than 10% wt. $CaTiO_3$ lest the TCC of the fired dielectric layer become too strongly negative.

At least 5% wt. of the zinc borate flux is required to obtain adequate sintering of the fired dielectric layer. However, when more than about 10% wt. flux is used, the electrical properties of the fired dielectric layer tend to be degraded.

In addition, the atomic ratio of zinc to boron is quite important. For example, if the Zn:B ratio is less than about 1, the relative amount of boron is too high and the boron tends to alter the stoichiometry of the metal titanates by extracting the Mg or Ca. A Zn:B ratio of at least 1.5 is therefore preferred. On the other hand, if the Zn:B ratio is greater than about 2, there is excess ZnO in the fired layer which, because ZnO is semiconductive in character, tends to degrade the electrical properties of the fired dielectric layer. Because $Al_2O_3$ is known to impart increased chemical durability to borate glasses, it may be substituted for up to about 50 mol % of the $B_2O_3$.

As indicated hereinabove, the compositions of the invention must contain 1–5 wt. % BaO which can be either a component of the zinc borate glass frit or it can be added to the particulate admixture as a separate component in the form of $BaCO_3$ and/or $BaTiO_3$. The purpose of the barium is to improve the sintering of the composition during firing. For this reason, at least about 1 wt. % barium (calculated as BaO) is required to obtain a noticeable effect. However, more than about 5 wt. % barium tends to raise the TCC of the fired composition too much. In general, for a given composition, less barium will be needed when the composition is air fired and more barium will be needed when the composition is fired in a non-oxidizing atmosphere such as nitrogen.

The use of MgO, CaO and ZnO or mixtures thereof is necessary only if $BaTiO_3$ is used in the composition. The function of these oxides is to avoid reduction of the dielectric during firing which tends to make the dielectric composition more semiconductive. It will be recognized that precursors of these divalent metal oxides may be used in the composition of the invention as well. By the term "precursor*" is meant compounds which upon firing in air are converted to metal oxides. These include hydrates, carbonate, hydroxides, nitrates, oxalates and alkoxides.

The $BaTiO_3$ component of the composition of the invention is commercially available in appropriate particle sizes. For the purpose of the invention, it is essential that the $BaTiO_3$, as well as the other dielectric materials, have an average particle size of no more than 1.5 $\mu m$ and preferably no more than 1.0 $\mu m$. On the other hand, when the average particle size of the solids is below about 0.5 $\mu m$, the particles become difficult to process into green tape and are therefore less suitable. An average particle size of 0.5–1.5 is therefore preferred.

Because the compositions of the invention are intended to be capable for use with copper electrodes as well as noble metal electrodes, volatile oxides such as lead oxide, bismuth oxide and cadmium oxide must not be used in the invention because they tend to undergo reduction to the metallic form when the composition is fired under non-oxidative conditions.

B. Green Tape Casting Solution

As mentioned above, green tapes of the dielectric composition of the invention are made by casting a dispersion of the dielectric material in a solution of polymeric binder and volatile organic solvent onto a flexible substrate, such as a steel belt or polymeric film, and then heating the cast layer to remove the volatile solvent therefrom.

The organic medium in which the ceramic solids are dispersed consists of the polymeric binder which is dissolved in a volatile organic solvent and, optionally, other dissolved materials such as plasticizers, release agents, dispersing agents, stripping agents, antifouling agents and wetting agents.

To obtain better binding efficiency, it is preferred to use at least 5% wt. polymer binder for 95% wt. ceramic solids. However, it is further preferred to use no more than 20% wt. polymer binder in 80% wt. ceramic solids. Within these limits, it is desirable to use the least possible amount of binder vis-a-vis solids in order to reduce the amount of organics which must be removed by pyrolysis.

In the past, various polymeric materials have been employed as the binder for green tapes, e.g., (poly)vinyl butyral, (poly)vinyl acetate, (poly)vinyl alcohol, cellulosic polymers such as methyl cellulose, ethyl cellulose, hydroxyethyl cellulose, methylhydroxyethyl cellulose, atactic polypropylene, polyethylene, silicon polymers such as (poly)methyl siloxane, (poly)methylphenyl siloxane, polystyrene, butadiene/styrene copolymer, polystyrene, (poly)vinyl pyrollidone, polyamides, high molecular weight polyethers, copolymers of ethylene oxide and propylene oxide, polyacrylamides, and various acrylic polymers such as sodium polyacrylate, (poly)lower alkyl acrylates, (poly)lower alkyl methacrylates and various copolymers and multipolymers of lower alkyl acrylates and methacrylates. Copolymers of ethyl methacrylate and methyl acrylate and terpolymers of ethyl acrylate, methyl methacrylate and methacrylic acid have been previously been used as binders for slip casting materials.

More recently, Usala, in U.S. Pat. No. 4,613,648 has disclosed an organic binder which is a mixture of compatible multipolymers of 0–100% wt. $C_{1-8}$ alkyl methacrylate, 100–0% wt. $C_{1-8}$ alkyl acrylate and 0–5% wt. ethylenically unsaturated carboxylic acid or amine. Because the polymers permit the use of minimum amounts of binder and maximum amounts of dielectric solids, their use is preferred with the dielectric composition of this invention.

The solvent component of the casting solution is chosen so as to obtain complete solution of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methyl ethyl ketone, 1,1,1-trichloroethane, tetrachloroethylene, amyl acetate, 2,2,4-triethyl pentandiol-1,3-monoisobutyrate, toluene and methylene chloride.

Frequently, the organic medium will also contain a small amount, relative to the binder polymer, of a plasticizer which serves to lower the glass transition temperature (Tg) of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, octyl phthalate, butyl benzyl phthalate, alkyl phosphates, polyalkylene glycols, glycerol, (poly)ethylene oxides, hydroxyethylated alkyl phenol, dialkyldithiophosphonate and (poly)isobutylene. Of these, butyl benzyl phthalate is most frequently used in acrylic polymer systems because it can be used effectively in relatively small concentrations.

C. Thick Film Paste

Often it may be desired to apply the compositions of the invention as a thick film paste by such techniques as screen printing. When the dispersion is to be applied as a thick film paste, conventional thick film organic media can be used with appropriate rheological adjustments and the use of lower volatility solvents. In this event, the compositions must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of inert liquids can be used as organic medium. The organic medium for most thick film compositions is typically a solution of resin a solvent and, frequently, a solvent solution containing both resin and thixotropic agent. The solvent usually boils within the range of 130°–350° C.

Especially suitable resins for this purpose are polymethacrylates of lower alcohols and monobutyl ether of ethylene glycol monoacetate.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol and high boilding alcohols and alcohol esters. Various combinations of these and other solvents are formulated to obtain the desired viscosity and volatility requirements for each application.

Among the thixotropic agents which are commonly used are hydrogenated castor oil and derivatives thereof. It is, of course, not always necessary to incorporate a thixotropic agent since the solvent/resin properties coupled with the shear thinning inherent in any suspension may alone be suitable in this regard.

The ratio of organic medium to inorganic solids in the dispersions can vary considerably and depends upon the manner in which the dispersion is to be applied and the kind of organic medium used. Normally, to achieve good coverage, the dispersions will contain complementally by weight 60–90% solids and 40–10% organic medium. Such dispersions are usually of semifluid consistency and are referred to commonly as "pastes".

The pastes are conveniently prepared on a three-roll mill. The viscosity of the pastes is typically within the following ranges when measured at room temperature on Brookfield viscometers at low, moderate and high shear rates:

| Shear Rate (Sec$^{-1}$) | Viscosity (Pa.s) | |
| --- | --- | --- |
| 0.2 | 100–5000 | |
| | 300–2000 | Preferred |
| | 600–1500 | Most Preferred |
| 4 | 40–400 | |
| | 100–250 | Preferred |
| | 140–200 | Most Preferred |
| 384 | 7–40 | |
| | 10–25 | Preferred |
| | 12–18 | Most Preferred |

The amount and type of organic medium (vehicle) utilized is determined mainly by the final desired formulation viscosity and print thickness.

D. Capacitor Processing

As described above, many multilayer capacitors are fabricated by printing on electrode metallization in the desired pattern upon a dielectric substrate which is a green tape. The printed dielectric substrates are stacked, laminated and cut to form the desired capacitor structures. The green dielectric material is then fired to effect removal of the organic medium from the electrode material and of the organic binder from the dielectric material. The removal of these materials is accomplished by a combination of evaporation and thermal decomposition during the firing operation. In some instances, it may also be desirable to interpose a preliminary drying step prior to firing. The thickness of the unfired green tape is typically about 1.2–1.3 mils and upon firing the thickness becomes about 0.9–1.0 mil.

When firing the above-described capacitor assemblages with silver-palladium electrodes, it is preferred to employ a first firing step in which the assemblage is heated slowly to 100°–550° C. which will be effective to remove all of the organic material without damage to the laminated assemblage. Typically the organic burn-out period is 18–24 hours to assure complete removal of organics. When this has been completed, the assemblage is then heated more rapidly to the desired sintering temperature.

The desired sintering temperature is determined by the physical and chemical characteristics of the dielectric material. Ordinarily the sintering temperature will be chosen to obtain maximum densification of the dielectric material. For the dielectric compositions of this invention, the temperature will range from 1000° to 1150° C. However, it will be recognized by those skilled in the art of fabricating capacitors that maximum densification is not always needed. Therefore, the term "sintering temperature" refers to the temperature (and implicitly the amount of time as well) to obtain the desired degree of densification of the dielectric material for the particular capacitor application. Sintering times also vary with the dielectric composition but ordinarily about 2.5 hours at the sintering temperature is preferred.

Upon completion of sintering, the rate of cooling to ambient temperature is carefully controlled in accordance with resistance of the components to thermal shock.

When fabricating MLC's with silver-palladium electrodes, peak firing temperatures will typically be about 1100° C. The peak firing temperatures should be below the melting point of the silver-palladium alloy that is used for the electrode to avoid migration of the conductive metal into the dielectric layer.

MLC's with Cu electrodes are processed according to the method described fully in U.S. patent application Ser. No. 3,259 filed Jan. 13, 1987, which is incorporated by reference herein. Capacitors with copper electrodes are fired in a furnace which has been sealed to contain a controlled atmosphere without significant leakage. Use of atmospheres with controlled oxygen partial pressures for firing MLC's with base metal electrodes is well known. Atmospheres of $N_2$, $H_2+N_2$, $CO+CO_2+N_2$ have been described and a variety of other atmospheres including $H_2+H_2O+N_2$, and $CO_2+H_2+N_2$ can be used. An atmosphere of $CO_2+H_2+N_2$ is preferred because of both the atmosphere control provided by such a mixture, and for safety reasons. Only nonexplosive levels of $H_2$ are needed, and the storage and piping of carbon monoxide are not required.

The green MLC's can be prefired at 400° C. in $N_2$ to remove most of the organic binders or the MLC's can be sintered directly without prefiring. A convenient heating rate is 25° C./min to 750° C. decreasing to 10° C./min to 1050° C. The soak period is usually 2-2.5 hours at 1050°-1065° C., and then the furnace is cooled at its natural rate. A gas mixture of $N_2+CO_2+H_2$ circulates through the furnace during the entire cycle with an adequate flow rate to maintain a slight positive pressure. The $CO_2/H_2$ ratio determines the oxygen partial pressure. Good results have been achieved for $CO_2/H_2$ ratios of 20/1 to 65/1 which produce oxygen partial pressures of $1\times10^{-9} - 1\times10^{-10}$ atm at 1050° C. as verified by an oxygen sensor installed in the hot zone of the furnace. If the atmosphere is more reducing, then delamination of the MLC's is likely to occur due to premature sintering of the electrodes and/or the dielectric can become semiconducting. If the atmosphere is more oxidizing, the copper electrodes will react excessively with, or dissolve into, the dielectric. A slight reaction between the electrodes and ceramic can be beneficial to good electrode bonding but should be minimized to avoid variations in properties for differing dielectric thicknesses and differing numbers of electrodes.

The following properties which are relevant to the ability of a given capacitor to function properly are referred to in the examples.

E. Test Procedures

Capacitance is a measure of the capability of a material to store an electrical charge. The units of capacitance are farads or fractions thereof such as microfarads ($10^{-6}$ farad), nanofarads ($10^{-9}$ farad) or picofarads ($10^{-12}$ farad).

Dissipation Factor (DF) is a measure of the phase difference between voltage and current. In a perfect capacitor the phase difference would be 90°. However, in practical dielectric systems, this phase difference is less than 90° by an amount $\sigma$ because of leakage and relaxation losses. In particular, DF is the tangent of the angle $\sigma$. Q is the reciprocal of DF. Capacitance and dissipation factors were measured using a Hewlett-Packard HP4274A multifrequency LCR meter.

Insulation Resistance (IR) is a measure of the ability of a charged capacitor to withstand leakage in DC current. Insulation resistance expressed as ohm. farads ($\Omega F$) is a constant for any given dielectric regardless of capacitance. 1 K.ohm.farads is 1000 ohms.farads. Insulation resistance was measured using a Hewlett-Packard 4140B pA meter after charging the capacitor for 2 mins with 100 VDC applied.

Temperature Coefficient of Capacitance (TCC) is a measure of the change of capacitance as a function of temperature with respect to the capacitance at 25° C. COG is an A.E.I. specification for TCC which permits capacitance change between $-55°$ C. and 125° C. of not more than 30 ppm/°C.

Dielectric Constant—The thickness and area of the dielectric layers were measured using polished sections of the capacitors and optical microscopy. The dielectric constant was calculated using the equation:

$$K = \frac{C}{A} \cdot \frac{t}{N}$$

where
C is the capacitance of the capacitor;
A is the electrode area in contact with the dielectric layer;
t is the thickness of the dielectric layer;
N is the number of dielectric layers.

EXAMPLES

Examples 1 and 2

A magnesium titanate powder was prepared as follows: 200.0 gms of titanium dioxide (Fisher Scientific) was milled with 103.5 gms of magnesium oxide (Baker Chemical Co.) for 5 hours in isopropanol using zirconia media. The amount of magnesium oxide included an excess of 3.0% over the stoichiometric amount to account for ignition loss. The dried mixture was calcined at 1050° C. for five hours and then the powder was ball milled (in isopropanol with zirconia balls) for 16 hours to achieve a particle size close to 1 micron. X-ray diffraction analysis indicated single phase $MgTiO_3$.

A zinc borate flux (A) containing barium oxide and manganese oxide was made according to the composition given in Table 1. The flux was prepared by milling zinc oxide, boric acid, manganese carbonate and barium carbonate together in isopropanol and calcining the dried powder at 700° C. for 5 hours. This powder was also milled for 16 hours after calcination (in isopropanol) to achieve a particle size close to 1 micron. The composition and method of making the flux are the same as described in U.S. Pat. No. 4,640,905 (Burn), assigned to the same assignee.

Ceramic tape was made by casting a milled slurry of 50.0 gms magnesium titanate and 3.5 gms of flux A (Example 1, Table 2) in 66.0 gms of binder solution (Du Pont 5200). A few drops of acetic acid were added to the slurry to improve dispersion. A second ceramic tape was made in the same way but with 5.0 gms of flux A added (Example 2). The ceramic tapes were made into 1209 size multilayer capacitors with six internal electrodes and five active dielectric layers, each about 25 microns thick when fired. A 70% Ag- 30% Pd paste (e.g., Du Pont 4772D or 4765W) was used for printing the internal electrodes. The capacitors were fired at b 1100° C. for 2.5 hours in air on a high purity aluminum oxide setter; they were then terminated using termination paste (e.g., Du Pont 4506) which was fired on at 750° C.

The capacitors of Example 1 were porous and therefore of no utility, but those of Example 2, with 9.1% flux densified well. However, it can be seen from the electrical data for Example 2 in Table 3 that D.F. was quite high, insulation resistance at 125° C. was quite low, and the TCC was well outside COG limits.

Example 3

A calcium titanate powder was made as follows: 100.0 gms of titanium dioxide (Fisher Scientific) were ball milled with 125.27 gms of calcium carbonate for 5 hours in isopropanol using zirconia media. The mixture was then calcined and milled using the same procedure as that described above for the magnesium titanate. The calcium titanate obtained had a particle size ($D_{50}$) of 0.90 microns and an X-ray diffraction pattern characteristic of $CaTiO_3$.

Multilayer capacitors were made as described above but for a ceramic mixture including calcium titanate, as shown in Table 2. The capacitors sintered well but D.F. was again quite high and insulation resistance was low. Although TCC was still outside COG limits, it was clear than an improved TCC could be obtained between those of Examples 2 and 3 by adjustment of the level of calcium titanate. It was concluded, however, that the composition of flux A was not suitable for achieving low DF (high Q) and high insulation resistance.

Examples 4 and 5

A zinc borate flux (B) was made with the composition given in Table 1. It was prepared by blending 100.0 gms boric acid (Fisher Scientific) with 197.4 gms of zinc oxide (Baker Chemical Co.) by milling for 5 hours in isopropanol with zirconia media, drying and then calcining at 700.C for 5 hours. The calcined powder was milled as described for flux A and had a particle size ($D_{50}$) of 1.2 microns.

Capacitors were made as described above but from ceramic tapes containing 5.7% and 9.1% of flux B (Examples 4 and 5, Table 2). These capacitors were porous after being fired and had no utility.

Examples 6, 7, 8, 9 and 10

In these examples, capacitors were made as described above but from tapes containing magnesium titanate, calcium titanate and flux B, together with an addition of $BaCO_3$, as shown in Table 2. Well sintered capacitors were obtained with all compositions, and low D.F. as well as good insulation resistance were measured in all cases (Table 3). COG TCC was achieved for Example 9 by blending the appropriate proportions of magnesium titanate and calcium titanate. By comparing the compositions of these examples with those of Examples 2 and 3, it was concluded that the presence of barium is necessary for good sintering but that the inclusion of manganese oxide leads to high D.F. and low insulation resistance.

Example 11

It was found that additions of sub-micron barium titanate powder (Fuji Titanium Co.) could be used instead of barium carbonate, at least for capacitors that have Ag-Pd electrodes and are fired in air. This is illustrated in Example 11 for which the barium carbonate of Example 9 was omitted and a comparable amount of barium added as barium titanate. Excellent electrical characteristics were obtained (Table 3).

Example 12

The compositions of this invention are compatible with copper electrodes. The ceramic tape of Example 6 was made into multilayer capacitors by the same method except that copper internal electrodes were used and the capacitors were fired at 1065° C. in an atmosphere of nitrogen, carbon dioxide and hydrogen, as fully described in our co-pending application EL-0213, Ser. No. 003,259. Copper termination past (Du Pont 7001D) was applied and fired on at 700° C. in nitrogen.

The capacitors had good electrical performance (Table 3), except that TCC did not meet COG requirements because the level of calcium titanate was too high.

Example 13

As described in Example 11, additions of barium titanate can be used instead of barium carbonate for capacitors that are fired in air with Ag—Pd electrodes. Because barium titanate additions include titanium dioxide as well as barium oxide, it is appropriate for capacitors with copper electrodes to compensate the added titanium oxide with MgO, CaO or ZnO, in order to maintain cation stoichiometry within suitable limits. This helps to avoid the formation of titanium rich phases, which tend to reduce and become semiconducting if the capacitor is fired in an atmosphere with low oxygen content.

In this example, barium titanate was added to the ceramic tape together with ZnO as shown in Table 2. Capacitors when then made with copper electrodes as described in Example 12. Good electrical properties, including COG TCC, were obtained (Table 3).

Examples 14A and 14B

In these examples, the magnesium titanate was made as in Example 1, but a different source of titanium oxide was used (EM Science). Also, the zinc borate flux was modified to include barium oxide by replacing half of the zinc (in moles) with barium, as indicated in Table 1 (Flux C). The flux was made as in Examples 4 and 5, but only 131.6 gms of ZnO oxide were used and 159.6 gms of barium carbonate were added.

Ceramic tape was made from a mixture of 46.5 gms of magnesium titanate, 3.5 gms of calcium titanate and 3.5 gms of flux C (Table 2). Capacitors were then made as described above: those of Example 14A had Ag-Pd electrodes and those of Example 14B had copper electrodes.

Good capacitor performance was obtained (Table 3), except that the capacitors with Ag-Pd electrodes had marginal TCC at −55° C., indicating that the level of calcium titanate should be decreased slightly.

Examples 15A and 15B

Capacitors were made as in Examples 14A and 14B, but a different amount and type of flux were used (Flux D). In this case, the same relative amounts of zinc and barium were used but part of the boron oxide was replaced with alumina. Alumina generally imparts improved chemical durability to borate frits. The frit was made by first wetting out 27.62 gms of fumed alumina (Degussa) with isopropanol and then adding 67.0 gms of boric acid (Fisher), 132.26 gms zinc oxide (Baker), and 160.41 gms of barium carbonate (Baker). The powders were then ball-milled for 5 hours, dried and calcined at 650° C. for 5 hours. The calcined powder was then milled in the same manner as the other fluxes described above. Compositions of the flux and ceramic tape are listed in Tables 1 and 2, respectively.

Excellent dielectric properties were obtained, including high values of Q (low D.F.). As in Example 14A, however, TCC was also marginal for the capacitors with Ag-Pd electrodes, indicating again that slightly less clacium titanate should be used for the capacitors fired in air. Measurement of equivalent series resistance (E.S.R.) at 134 MHz, using a Boonton Electronics transmission line, gave a value of 0.079 ohms for capacitors with Ag—Pd electrodes and 0.025 ohms for those with copper electrodes. These results confirm that significant performance advantage may be realized at high frequencies by using copper electrodes in multilayer capacitors.

TABLE 1

| Flux No. | Formula (moles) | ZnO | BaO | $B_2O_3$ | $MnO_2$ | $Al_2O_3$ |
|---|---|---|---|---|---|---|
| A | 0.87 ($Zn_3B_2O_6$) · 0.13 ($BaMnO_3$) | 54.86 | 18.82 | 15.65 | 10.66 | — |
| B | $3ZnO \cdot B_2O_3$ | 77.80 | — | 22.20 | — | — |
| C | $2ZnO \cdot BaO \cdot B_2O_3$ | 42.19 | 39.76 | 18.05 | — | — |
| D | $6ZnO \cdot 3BaO \cdot 2B_2O_3 \cdot Al_2O_3$ | 41.04 | 38.68 | 11.71 | — | 8.57 |

TABLE 2

DIELECTRIC COMPOSITIONS (WT %)

| Example No. | $MgTiO_3$ | $CaTiO_3$ | Flux | ZnO | BaO | $B_2O_3$ | $MnO_2$ | $Al_2O_3$ | Additive Type | Amt. |
|---|---|---|---|---|---|---|---|---|---|---|
| 1 | 93.5 | — | 6.5 | 3.37 | 1.22 | 1.02 | 0.69 | — | — | — |
| 2 | 90.9 | — | 9.1 | 4.99 | 1.71 | 1.42 | 0.97 | — | — | — |
| 3 | 81.8 | 9.1 | 9.1 | 4.99 | 1.71 | 1.42 | 0.97 | — | — | — |
| 4 | 94.3 | — | 5.7 | 4.43 | — | 1.27 | — | — | — | — |
| 5 | 90.9 | — | 9.1 | 7.08 | — | 2.02 | — | — | — | — |
| 6 | 81.1 | 9.0 | 6.3 | 4.90 | — | 1.40 | — | — | $BaCO_3$ | 3.6 |
| 7 | 82.6 | 9.2 | 6.4 | 4.98 | — | 1.42 | — | — | $BaCO_3$ | 1.8 |
| 8 | 84.4 | 7.3 | 6.4 | 4.98 | — | 1.42 | — | — | $BaCO_3$ | 1.8 |
| 9 | 85.3 | 6.4 | 6.4 | 4.98 | — | 1.42 | — | — | $BaCO_3$ | 1.8 |
| 10 | 86.2 | 5.5 | 6.4 | 4.98 | — | 1.42 | — | — | $BaCO_3$ | 1.8 |
| 11 | 84.6 | 6.4 | 6.4 | 4.98 | — | 1.42 | — | — | $BaTiO_3$ | 2.7 |
| 12 | 81.1 | 9.0 | 6.3 | 4.90 | — | 1.40 | — | — | $BaCO_3$ | 3.6 |
| 13 | 82.3 | 6.2 | 6.2 | 4.82 | — | 1.41 | — | — | $BaTiO_3$ ZnO | 4.4 0.9 |
| 14 | 86.9 | 6.5 | 6.5 | 2.74 | 2.58 | 1.17 | — | — | — | — |
| 15 | 86.1 | 6.5 | 7.4 | 3.04 | 2.86 | 0.87 | — | 0.63 | — | — |

TABLE 3

DIELECTRIC PROPERTIES
(Average of 5 or 6 Capacitors)

| Ex. No. | Elect. | C (pF) | K | D.F.(%) @ 1 KHz | I.R.(Kohm. F) @ 25° C. | I.R.(Kohm. F) @ 125° C. | TCC (ppm/°C.) @ −55° C. | TCC (ppm/°C.) @ 125° C. |
|---|---|---|---|---|---|---|---|---|
| 1 | Ag/Pd | — | | | Porous | | — | — |
| 2 | Ag/Pd | 169 | 18 | 0.10 | 3.1 | 0.03 | +143 | +168 |
| 3 | Ag/Pd | 183 | 20 | 0.10 | 0.7 | 0.03 | −63 | −199 |
| 4 | Ag/Pd | — | | | Porous | | — | — |
| 5 | Ag/Pd | — | | | Porous | | — | — |
| 6 | Ag/Pd | 169 | 23 | 0.02 | 7.7 | 5.0 | −144 | −88 |
| 7 | Ag/Pd | 168 | 21 | 0.01 | 13.1 | 5.3 | −101 | −35 |
| 8 | Ag/Pd | 188 | 20 | <0.01 | 25 | 6.5 | −40 | +4 |
| 9 | Ag/Pd | 187 | 20 | <0.01 | 16 | >5 | −16 | +21 |
| 10 | Ag/Pd | 184 | 19 | <0.01 | 34 | 7.5 | +3 | +41 |
| 11 | Ag/Pd | 186 | 20 | <0.01 | >9 | >9 | −10 | +24 |
| 12 | Cu | 169 | 20 | 0.05 | 5.3 | 0.6 | −149 | −139 |
| 13 | Cu | 168 | 20 | 0.03 | 5.8 | 0.6 | −8 | +30 |
| 14A | Ag/Pd | 206 | 18 | <0.01 | 1.9 | >2 | −31 | +10 |
| 14B | Cu | 168 | 18 | 0.02 | 1.8 | >2 | −24 | +15 |
| 15A | Ag/Pd | 200 | 20 | <0.01 | 4.9 | >2.7 | −34 | +13 |
| 15B | Cu | 191 | 18 | 0.01 | 9.2 | 3.3 | −17 | +14 |

I claim:

1. A composition for the preparation of low-firing dielectrics consisting essentially of an admixture of finely divided particles of:
   (a) $MgTiO_3$;
   (b) 0–10% wt., basis total solids, $CaTiO_3$;
   (c) 5–101 % wt., basis total solids, zinc borate flux in which the atomic ratio of zinc to boron is 1-2, the flux containing 0–5% wt., basis total solids, BaO, and in which up to 50 mol % of the $B_2O_3$ may be replaced by $Al_2O_3$;
   (d) 0–5% wt., basis total solids, of a barium compound selected from $BaCO_3$, $BaTiO_3$ and mixtures thereof; and
   (e) an amount of a divalent metal oxide or precursor thereof selected from MgO, CaO, ZnO and mixtures thereof in amount approximately molarly equivalent to the amount of $BaTiO_3$ in the composition, the total amount of Ba in the composition, calculated as BaO, being 1–5% wt. of the total solids, the solids being free of Pb-, Bi- and Cd-containing compounds.

2. The composition of claim 1 in which the admixture of components (a)–(e) is dispersed in an organic medium.

3. A slip-casting composition comprising the composition of claim 2 in which the admixture is dispersed in an organic medium comprising a solution of volatile organic solvent and organic polymeric binder and the dispersion is of slip-casting consistency.

4. A dielectric green tape comprising a cast heated to remove the volatile organic solvent.

5. A dielectric thick film paste comprising the composition of claim 2 in which the admixture is dispersed in organic medium comprising a solution of a resin in a relatively low volatility solvent.

6. The film paste of claim 5 which also contains a thixotropic agent.

7. A ceramic multilayer element comprising a plurality of internal thick film metallic conductive layers separated by layers of the dielectric composition of claim 1, both the ceramic and conductive layers having been fired at a temperature below the melting point of the conductive metal to volatilize organic medium therefrom and to sinter the dielectric materials without melting the conductive metal.

* * * * *